Oct. 12, 1937.  O. WITTEL  2,095,849
CAMERA MAGAZINE
Filed Nov. 23, 1935  2 Sheets-Sheet 1

INVENTOR.
Otto Wittel
BY
ATTORNEYS

Oct. 12, 1937.                O. WITTEL              2,095,849
                          CAMERA MAGAZINE
                        Filed Nov. 23, 1935            2 Sheets-Sheet 2
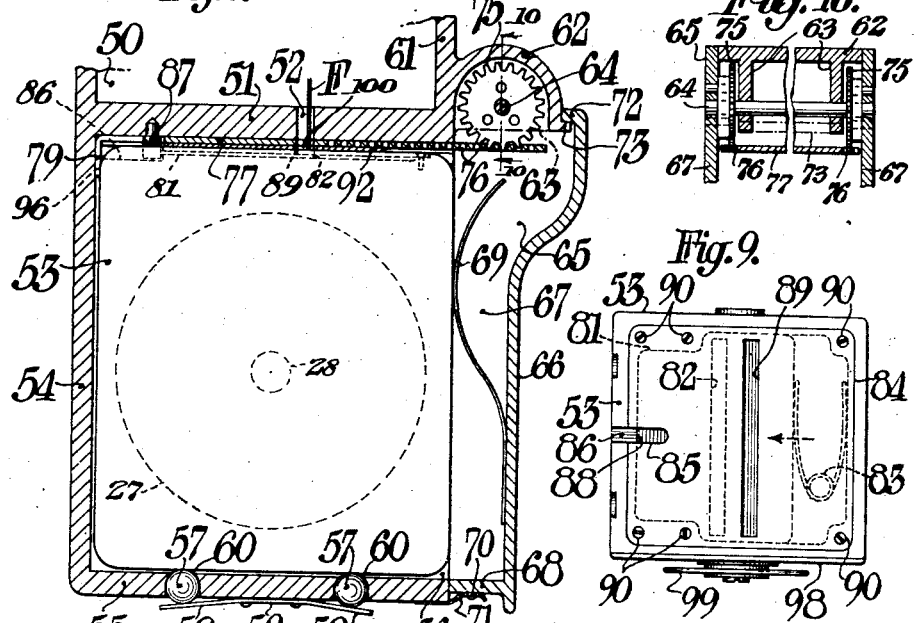
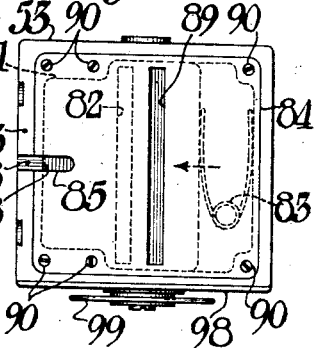
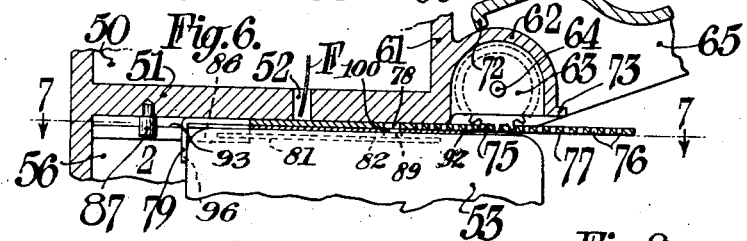
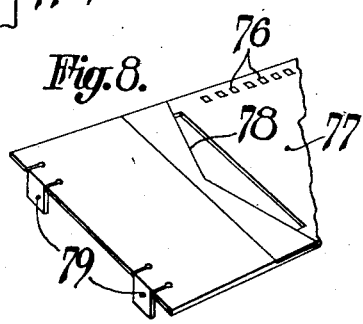
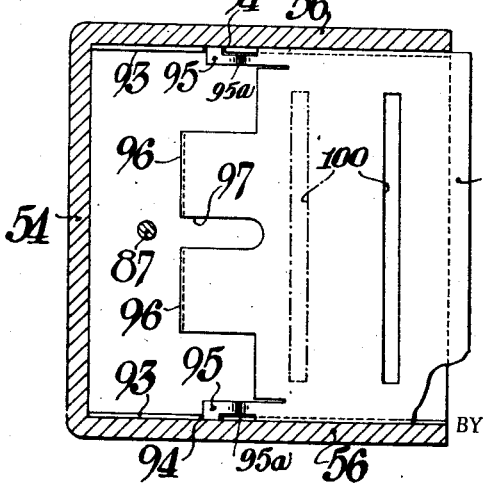
Otto Wittel,
INVENTOR
ATTORNEYS.

Patented Oct. 12, 1937

2,095,849

UNITED STATES PATENT OFFICE 2,095,849

CAMERA MAGAZINE

Otto Wittel, Rochester, N. Y., assignor, by mesne assignments, to Eastman Kodak Company, Jersey City, N. J., a corporation of New Jersey Application November 23, 1935, Serial No. 51,295

19 Claims. (Cl. 95—31)

This invention relates to photography, and more particularly to magazines for photographic cameras. One object of my invention is to provide a magazine into which various lengths of film can be wound and severed so that the film may be removed from the camera to a dark room for processing. Another object of my invention is to provide a magazine which is carried by a camera section, and which is resiliently pressed into an operative position. Another object of my invention is to provide a magazine with an opening, normally closed by a shutter, through which the film may pass when the shutter is moved to an inoperative position by placing the magazine in the camera. Another object of my invention is to provide a means for severing the film and for automatically threading it into the magazine reel when the magazine is removed and inserted into a camera. Still another object of my invention is to provide a magazine which requires the minimum amount of manipulation and which can be readily handled by an unskilled operator.

The magazine construction which will be more fully hereinafter described is particularly designed for use in the apparatus shown in my two Patents Nos. 2,051,192 for Photographic camera, granted August 18, 1936, and 2,051,193 for Camera back construction, granted August 18, 1936. These two applications show features of a camera designed primarily for taking portraits to be used in a studio in which a series of photographs are rapidly made on a strip of roll film. These photographs may be made either singly or in strips containing a number of exposures, it being one of the objects of my invention to provide an apparatus which may make five or six pictures in a very few seconds so that the photographer can select the exposures having the best expressions for producing portraits.

Such a camera may use any size of film but it is intended to use film 70 mm. in width, this being found a satisfactory size for my purpose. The film may be supplied in relatively long rolls, such as 50 or 100 feet, and the film is automatically fed intermittently past an exposure area into a take-up magazine into which it is automatically threaded, the magazine being able to take considerable lengths of film but not the complete length furnished by the supply roll.

The magazine construction which is the subject of this application is the take-up magazine, and it is intended that this magazine should be removed after relatively short lengths of film have been wound on it. For instance, if a photographer should take five or six groups of pictures of perhaps six exposures each, it would probably be convenient for him to cut off the film and remove the magazine so that an assistant can proceed with the development of the film. However, the amount of film which can be wound on the take-up magazine and its method of use is largely optional.

Coming now to the drawings wherein like reference characters denote like parts throughout:

Fig. 5 is a view similar to Fig. 1 but of a second embodiment of my invention, the magazine being shown in elevation.

Fig. 6 is a fragmentary sectional detail with the magazine shown in elevation showing the magazine partially removed from the camera with the shutter closed and with the knife as it appears after severing the film.

Fig. 7 is a section on line 7—7 of Fig. 6, and

Fig. 8 is a detail perspective view of the film severing knife.

Fig. 9 is a top plan view of the magazine shown in accordance with the second embodiment of my invention on a reduced scale.

Fig. 10 is a vertical sectional view taken substantially on the line 10—10 of Fig. 5.

Figure 1:
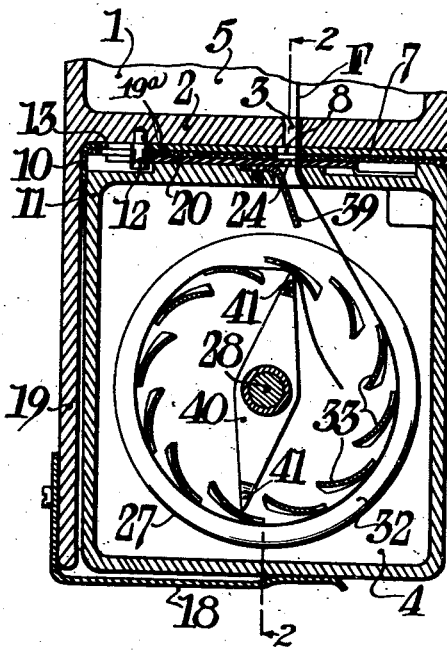
Fig. 1 is a section on line 1—1 of Fig. 2 through the lower part of a camera and a take-up magazine constructed in accordance with and embodying one form of my invention.

In a camera constructed in accordance with the showing of my co-pending applications above referred to, the camera body 1 is provided with a bottom wall 2 through which a slot 3 extends to permit a film F to pass from the exposure frame into a take-up magazine designated broadly as 4. On the side walls 5 of the camera, near the bottom wall 2, there are grooves 6 to receive the side edges of a slide 7 which performs two functions, that is, it slides the magazine 4 from the camera at the same time it severs the film F. This is accomplished in the following manner: The slide 7 has a slot 8 normally registering with the slot 3 in the camera wall, but when the handle 9 is drawn in the direction of the arrow shown in Fig. 1, the slide moves so that the edge of the slot 8 cuts the film as the slide moves to the position shown in Fig. 4. As the handle 9 is drawn out a hook 10 engages a rear wall 11 of the magazine 4 so that the magazine moves from the camera with the slide 7 which comprises the knife. However, as soon as the movement of the knife is stopped, by means of the pin 12 reaching the end of a slot 13 in the slide 7, further movement of the magazine can only take place when the spring latch 14 is swung about the hinge pintle 15 so that the aperture 16 is disengaged from the pin 17. The magazine may then be pressed downwardly to clear the hinged latch member, this action being possible because of the spring 18 carried by the camera wall 19. This spring is the sole means for holding the magazine tightly in contact with the camera wall 2.

In order to afford a light-tight connection between the magazine 4 and the slide 7, a layer of velvet, plush, or other suitable material 19a is provided, as clearly illustrated in Fig. 1. This material tightly engages both the slide 7 and the slide 20 to provide an effective light lock therebetween when the magazine is secured to the camera.

Figure 3:
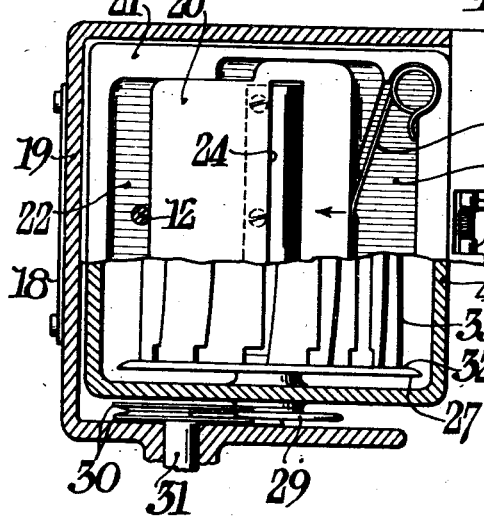
Fig. 3 is a section on line 3—3 of Fig. 2.

It is, of course, necessary to render the magazine light-tight before it is removed from the camera body. This is accomplished by means of a slide 20 which, as best shown in Fig. 3, is mounted on the top wall 21 of the magazine 4 and is so arranged that it may slide in a recess 22 which may be formed in the top wall of the magazine. The movement of the slide is caused by a spring 23 which exerts a thrust in the direction shown by the arrow in Fig. 3. However, when the magazine is in the position shown in Fig. 1, the slide contacts with the pin 12 extending downwardly from the camera wall 2 so that a slot 24 in the slide registers with the slot 3 in the magazine wall and with the slot 8 in the slide 7.

Figure 4:
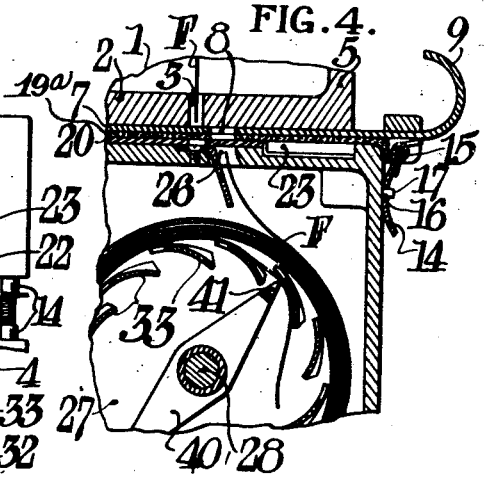
Fig. 4 is a fragmentary detail section showing the magazine partially removed from the camera with the magazine shutter in a closed position, and showing the position of a knife after having severed the film.

When the handle 9 is drawn out the magazine moves with the slide 7 away from the pin 12, permitting the spring 23 to move the slide 20 to the position shown in Fig. 4, in which the slot 26, through which the film enters the magazine, is completely closed. Thus, this slot is rendered light-tight before the magazine is removed from the camera.

In order to wind film up on the take-up reel 27 this reel is driven by power. A shaft 28 carries a disk 29 which is adapted to engage between a pair of spring disks 30 which are power driven by a shaft 31 from a suitable source of power not shown in this application. The spring disks 30 only frictionally engage the smooth periphery of the disk 29, and consequently there is a slip drive which can readily take care of the small difference in driving speed due to the varying diameter of the take-up reel.

Figure 2:
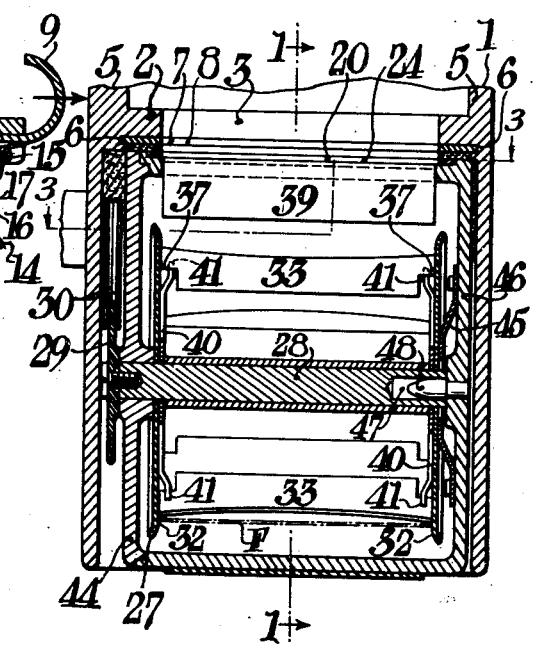
Fig. 2 is a section on line 2—2 of Fig. 1.

The take-up reel consists of a pair of similar spaced flanges 32 mounted to turn freely on the shaft 28, there being a series of curved, arcuate-shaped spoke members 33. These spoke members, as best shown in Fig. 2, are made slightly concave in form so that a film F wound upon the spoke members will contact only at the extreme edges near the flanges 32 and will eliminate the possibility of scratching either surface of a film wound thereon. In order to turn the reel to wind the film, the hub member 28 is provided with an arm 40 on the inside of both flanges, this arm terminating in ends 41 which are of such a length that when the disk 29 is turned the ends 41 of the arms may turn beneath the spoke members 33 by passing through the cut-out notches 37 of the spokes. Thus, when there is no film on the reel 27, the arms may revolve idly.

When the film F is moved downwardly through the registering openings into the magazine 4, the guiding plate 39 directs the film between a pair of spoke members 33 against one of which the film is clamped by the arms 40. The space between the arms 40 and the spokes 33 is less than the thickness of the film, so that the points 41 of the arms will anchor the end of the film in place. The reel is not moving as the end of the film approaches, but since the film is being moved, and the shaft 28 with the arms 40 are driven by a source of power, not shown, as soon as the film is clamped against the spoke members 33, the reel will be turned also. Since these arms strike the surface of the film F, the film will be unable to bend through the narrow notches 37 in the ends of the spokes, and the reel will start to turn, being turned through the action of the arms 40. Thus, the end of the film is immediately locked against the take-up reel and the disk 29 will continue to drive the reel as long as the camera continues to run. After the desired amount of film is wound on the reel the camera is stopped, the handle 9 is drawn out by the operator, sliding the magazine 4 from the camera body, permitting the spring 23 to close the slot 24, rendering the magazine light-tight, and moving the magazine to a point at which it can readily be grasped by an operator. By releasing the spring latch 16—17, and pressing slightly downwardly upon the magazine it can be withdrawn from above the spring 18.

In order to remove film which has been wound on the reel from the magazine it is only necessary to withdraw the top 44 which forms the cover of the magazine and which carries with it the disk 29, shaft 28, and reel 27. Thus the film is readily accessible for removal for the fluid treatment operations.

In order to prevent the reel 27 from turning too freely, I prefer to provide a tensioning spring 45 on the bottom wall 46 of the magazine, this spring being arranged to press on one of the flanges 32. The end of the shaft 28 is provided with an aperture 47 adapted to engage a pin 48 in the bottom wall 46 of the magazine when the cover is on the magazine and the reel has been inserted into its operative position.

Referring now particularly to Figs. 5–9 inclusive, wherein a second and preferred embodiment of my invention is shown, the magazine holding structure is somewhat different from that described above. As indicated in Fig. 5 the camera 50 is provided with a bottom wall 51 having a slot 52 through which the film F may pass to the magazine 53. A rear wall 54 of the camera extends downwardly, and there is a bottom wall 55 forming a box-like housing with the side walls 56 for receiving the magazine 53. In order to hold the magazine in its operative position I provide a plurality of balls 57 which are spring-pressed upwardly by the ends 58 of a leaf spring 59. Because the bottom wall is provided with an aperture 60, the top of which is insufficient to pass the balls 57, their total upward movement is limited so that when the magazine 53 is withdrawn from the housing the balls will not be released and move into the housing. The apertures 60 are, of course, larger at the bottom than they are at the top of the wall.

A front wall 61 of the camera is provided with an inverted cup-shaped wall 62 connected at the ends by walls 63 to form a housing in which a shaft 64 is mounted. This shaft extends transversely of the housing and constitutes a pintle on which the cover member 65 is hinged. This cover member is in the shape of a shallow, box-like enclosure and is provided with a rear wall 66, side walls 67, and a bottom wall 68. A spring 69 is mounted in this cover to press the magazine 53 into an operative position, and a snap-latch consisting of a lug 70 adapted to snap into an opening in a spring 71 is used to hold the cover in a closed position.

When in this position a flange 72 engages a cooperating flange 73 on the end of wall 62 to form a light-tight connection. When the snap-latch 70—71 is released, the cover may be swung about the hinge pintle 64 from the position shown in Fig. 5 to the position shown in Fig. 6. This movement not only opens the cover, but because the hinge pintle 64 is keyed to the cover 66 it turns with it. Mounted on the pintle 64 are a pair of gear members 75, these gears having teeth adapted to engage in apertures 76 in a slide 77 carried by camera wall 51.

Like the slide 7, slide 77 performs two functions, in that it serves as a knife when the edge 78 passes the slot 52, through which film passes to the magazine, and because of the downwardly extending lugs 79 the slide 77 likewise moves the magazine 53 from the camera.

The magazine 53 is provided with a somewhat different type of shutter to render the slot 80 through which film passes to the magazine light-tight as the magazine is withdrawn from the camera. As best shown in Fig. 9 the top of the magazine carries a shutter member comprising a slide 81 including a slot 82. Slide 81 is pressed by spring 83 lying in a recess beneath the cover plate 84 in the direction shown by the arrow, the cover plate 84 being notched at 85. The top of the magazine 53 is recessed at 86 so that when the magazine is moved into the camera, a pin 87 on the camera wall 51 can pass through the slot 86, engage the edge 88 of the slide 81, and move it to a position wherein the slot 82 will register with the slot 89 in the cover plate, so that film can pass through this opening.

The cover plate 84 may be held on as by a series of screws 90 so that the top of the magazine will present a smooth surface which will slide readily into the camera.

Between the cover plate 84 of the magazine and the slidable plate 77 which forms the knife for cutting off film, there is a supplementary shutter member 92, as best shown in Fig. 7. The reason for this supplementary shutter member 92 is that it is necessary to form a cover for the slot 52 when the magazine is removed just as it is necessary to form a cover for the slot 89 in the magazine. The plate 92 is mounted to slide on rails 93 formed up near the top of the side walls 56. These rails are provided with notches 94 into which the downwardly formed spring arms 95 of the slide 92 may snap as the slide is drawn outwardly. The outward movement of the slide is due to the frictional engagement with the top of the magazine 53.

When the door 66 has been swung open as indicated in Fig. 6, the supplementary slide or shutter 92 is in the position shown in Fig. 6. When, however, a magazine is inserted, the magazine engages a pair of downwardly extending arms or lugs 96 on the end of slide 92 moving the slide inwardly as the cover 66 is closed. This will permit the pin 87 to slide through a slot 97 cut in the slide 92. Before the slide starts to move the top wall of the magazine engages the underside of the spring arms 95 at the cam surfaces 95ª thereof and cams them out of the slots 94 in the side rails, permitting the slide member to move. The cover can then be closed to hold the parts in an operative position. The slide 92 is provided with a slot 100 which is arranged to register with the slot 52 when the slide is in the position shown in Fig. 5, this position being illustrated in broken lines in Fig. 7. When, however, the slide 92 is moved to the right, as shown in Fig. 6, the slot 100 moves out of registry with the slot 52, as shown in Fig. 6. This latter portion of the slot 100 is illustrated in solid lines in Fig. 7.

The operation of the preferred form of my invention shown in Figs. 5–9 inclusive is as follows: After the necessary amount of film F has been wound through the cooperating slots 52 and 89, and it is desired to remove the film in magazine 53, the door 66 is swung open, thus causing the gear 75 to turn, and by meshing in the apertures 76, to slide the knife member 78 across slot 52 thus severing the film. As the magazine 53 moves outwardly the slide 81 of the magazine under the impulse of spring 83 moves toward the position shown in Fig. 9, so that the slot 89 is completely covered before the magazine is withdrawn from the camera. As the magazine is drawn out it also moves the slide 92 so that it will cover up the slot 52 before the door is completely opened, and any film remaining in the camera 51 will be adequately protected from light.

The interior construction of the magazine 53 is exactly like the interior construction of the magazine 4 shown in the first four figures, that is, the magazine is provided with a cover member 98 on one side, this cover member carrying a driving disk 99 and a reel construction exactly the same as the reel in the first-mentioned embodiment of my invention.

When an operator desires to place a fresh magazine in the camera, it is only necessary to slide the magazine 53 into the camera and close the door 66, thus opening the slots 52 and 89 so that film F can be passed into the magazine. As the film passes through these slots it may strike the plate 39 so that the end of the film will be directed between a pair of the spokes 33 in position to be caught by one of the arms 41, since the arms are driven and the reel and spokes remain stationary up to the time that film is caught between an underside of a spoke and an arm 41. As the arms 41 continue to rotate under power derived through the driving disk 99, the entire reel is turned to wind convolutions of film upon the spokes.

What I claim is:

1. In a magazine camera, the combination with a magazine receiving chamber having a slot therein through which film is adapted to pass, of a pair of slides movably mounted adjacent the slot and adapted to cover and uncover the slot, one slide including a knife for severing the film, said slide including downwardly turned lugs adapted to engage said magazine for sliding said magazine from the camera, and the other slide being adapted to prevent light from leaking through the magazine when the magazine is removed from said camera.

2. In a magazine camera, the combination with a magazine receiving chamber having a slot therein through which film is adapted to pass, of a pair of slides movably mounted adjacent the slot and adapted to cover and uncover the slot, one slide including a knife for severing the film, magazine engaging lugs carried by said slide adapted to engage said magazine for sliding it from the camera, and the other slide being adapted to prevent light from leaking therethrough, said slides being so mounted that one may move independently of the other.

3. In a magazine camera, the combination with a camera provided with a magazine receiving chamber having a slot therein through which film is adapted to pass, of a slide member movably mounted on the camera and adapted to cover and uncover the slot, a movable door to the magazine receiving chamber, and movable connections between said slide and door for moving the former by the latter.

4. A magazine camera comprising a slide member movably mounted on the camera and including a plurality of apertures in an edge thereof, a pinion movably carried by the camera, a gear mounted on and rotatable with said pinion and engaging said apertures, and a door to the magazine chamber adapted to turn the pinion and gear whereby the slide may be moved positively by opening the door.

5. In a magazine camera, the combination with a camera provided with a slotted magazine receiving chamber, of a slide adapted to close the slot, a knife carried by the slide adapted with an edge of the slot to form a means for shearing a film passing through the slot, a door to the magazine receiving chamber hingedly mounted on the camera, operable connections between the door and slide for operating the latter by the former.

6. In a magazine camera, the combination with a camera provided with a slotted magazine receiving chamber, of a slide adapted to close the slot, a knife carried by the slide adapted with an edge of the slot to form a means for shearing a film passing through the slot, a door to the magazine receiving chamber hingedly mounted on the camera, operable connections between the door and slide for operating the latter by the former, a second slide carried by the camera and adapted to cover and uncover the slot in the magazine chamber having frictional engagement with the first mentioned slide.

7. In a magazine camera, the combination with a camera provided with a slotted magazine receiving chamber, of a slide adapted to close the slot, a knife carried by the slide adapted with an edge of the slot to form a means for shearing a film passing through the slot, a door to the magazine receiving chamber hingedly mounted on the camera, operable connections between the door and slide for operating the latter by the former, a second slide carried by the camera and adapted to cover and uncover the slot in the magazine chamber having frictional engagement with the first mentioned slide, and including means separate from said first mentioned slide for limiting its movement with respect to the camera.

8. In a magazine camera, the combination with a camera provided with a slotted magazine receiving chamber, of a slide adapted to close the slot, a knife carried by the slide adapted with an edge of the slot to form a means for shearing a film passing through the slot, a door to the magazine receiving chamber hingedly mounted in the camera, operable connections between the door and slide for operating the latter by the former, a second slide carried by the camera and adapted to cover and uncover the slot in the magazine chamber having frictional engagement with the first mentioned slide, and including means separate from said first mentioned slide for limiting its inward movement with respect to the camera, a spring arm carried by the slide, and a notch in the magazine chamber adapted to be engaged by said spring arm to position said slide in an operative position covering said slot.

9. In a magazine camera, the combination with a camera provided with a slotted magazine receiving chamber, of a slide adapted to close the slot, a knife carried by the slide adapted with an edge of the slot to form a means for shearing a film passing through the slot, a door to the magazine receiving chamber hingedly mounted in the camera, operable connections between the door and slide for operating the latter by the former, a second slide carried by the camera and adapted to cover and uncover the slot in the magazine chamber having frictional engagement with the first mentioned slide, and including means separate from said first mentioned slide for limiting its inward movement with respect to the camera, a spring arm carried by the slide, and a notch in the magazine chamber adapted to be engaged by said spring arm to position said slide in an operative position covering said slot, and a magazine adapted to be placed in said magazine chamber through a predetermined path, said magazine being adapted in passing through said path to release the spring arm from said notch.

10. In a magazine camera, the combination with a camera provided with a slotted magazine receiving chamber, of a slide adapted to close the slot, a knife carried by the slide adapted with an edge of the slot to form a means for shearing a film passing through the slot, a door to the magazine receiving chamber hingedly mounted on the camera, operable connections between the door and slide for operating the latter by the former, a second slide carried by the camera and adapted to cover and uncover the slot in the magazine chamber having frictional engagement with the first mentioned slide, and including means separate from said first mentioned slide for limiting its movement with respect to the camera, means including a latch for holding the second mentioned slide in an operative position covering said slot in the magazine chamber, and a magazine insertable in the magazine chamber for releasing the latch.

11. In a magazine camera, the combination with a camera provided with a slotted magazine receiving chamber, of a slide adapted to close the slot, a knife carried by the slide adapted with an edge of the slot to form a means for shearing a film passing through the slot, a door to the magazine receiving chamber hingedly mounted on the camera, operable connections between the door and slide for operating the latter by the former, a second slide carried by the camera and adapted to cover and uncover the slot in the magazine chamber having frictional engagement with the first mentioned slide, and including means separate from said first mentioned slide for limiting its movement with respect to the camera, means including a latch for holding the second mentioned slide in an operative position covering said slot in the magazine chamber, a magazine insertable in the magazine chamber for releasing the latch, and a lug on said slide adapted to engage the magazine whereby the magazine may move the slide from its operative to an inoperative position as the magazine is moved into its chamber.

12. In a magazine camera, the combination with a slotted camera body, of a slotted magazine adapted to engage the slotted camera body with the slots in registration, means for closing the slots in the camera and in the magazine controlled by movement of the magazine relatively to the camera.

13. In a magazine camera, the combination with a slotted camera body, of a slotted magazine adapted to engage the slotted camera body with the slots in registration, means carried by the magazine for closing its slot, means carried by the camera for closing its slot, both of said means being simultaneously operable by moving the magazine with respect to the camera.

14. In a magazine camera, the combination with a slotted camera body, of a slotted magazine adapted to engage the slotted camera body with the slots in registration, separate slides movably mounted on the camera and on the magazine for closing their respective slots, and means rendered operative by moving the magazine from the camera for closing both of the slide members whereby film in the camera and magazine is protected against fogging light.

15. In a magazine camera, the combination with a slotted camera body, of a slotted magazine adapted to engage the slotted camera body with the slots in registration, separate slides movably mounted on the camera and on the magazine, means for moving the camera slide including a door hingedly attached to the camera, lugs on the camera slide adapted to move said magazine, a pin on the camera adapted to engage the magazine slide, a spring for moving the magazine slide into an operative position closing the slot, whereby when the magazine is withdrawn by moving the door and the camera slide, the magazine will be moved from the magazine chamber and said pin and the slot in the magazine may be covered.

16. In a magazine camera the combination with a slotted magazine chamber, of rails in the chamber including notches therein, a slide mounted to move on said rails, spring arms carried by the slide adapted to engage said notches for latching said slide in an operative position covering said slot.

17. In a magazine camera the combination with a slotted magazine chamber, of rails in the chamber including notches therein, a slide mounted to move on said rails, spring arms carried by the slide adapted to engage said notches for latching said slide in an operative position covering said slot, said spring arms including cams projecting from said slide, a magazine adapted to move into the chamber, said cams projecting into the path of said magazine whereby the spring arms may be cammed from the notches by entering a magazine into the chamber.

18. In a magazine camera the combination with a slotted magazine chamber, of rails in the chamber including notches therein, a slide mounted to move on said rails, spring arms carried by the slide adapted to engage said notches for latching said slide in an operative position covering said slot, said spring arms including cams projecting from said slide, a magazine adapted to move into the chamber, said cams projecting into the path of said magazine whereby the spring arms may be cammed from the notches by entering a magazine into the chamber, and lugs carried by the slide and engageable by the magazine for moving the slide from its operative to an inoperative position in which said slot is uncovered.

19. In a magazine camera, the combination with a camera body including a magazine chamber having a slot through which film may pass, a pair of slotted slides movably carried by the camera body and adapted to be moved thereon, one slide carrying a knife and the other being adapted to render the slot light tight, means for guiding a magazine into the magazine chamber, both slides including lugs extending into the path of a magazine being loaded into the chamber whereby both slides may be moved by the magazine into an inoperative position to pass a film through the slot into the magazine chamber.

OTTO WITTEL.